March 15, 1960     K. NEIDHARDT     2,928,523
ENDLESS CONVEYOR FOR LOOSE MATERIALS
Filed May 17, 1957     2 Sheets-Sheet 1
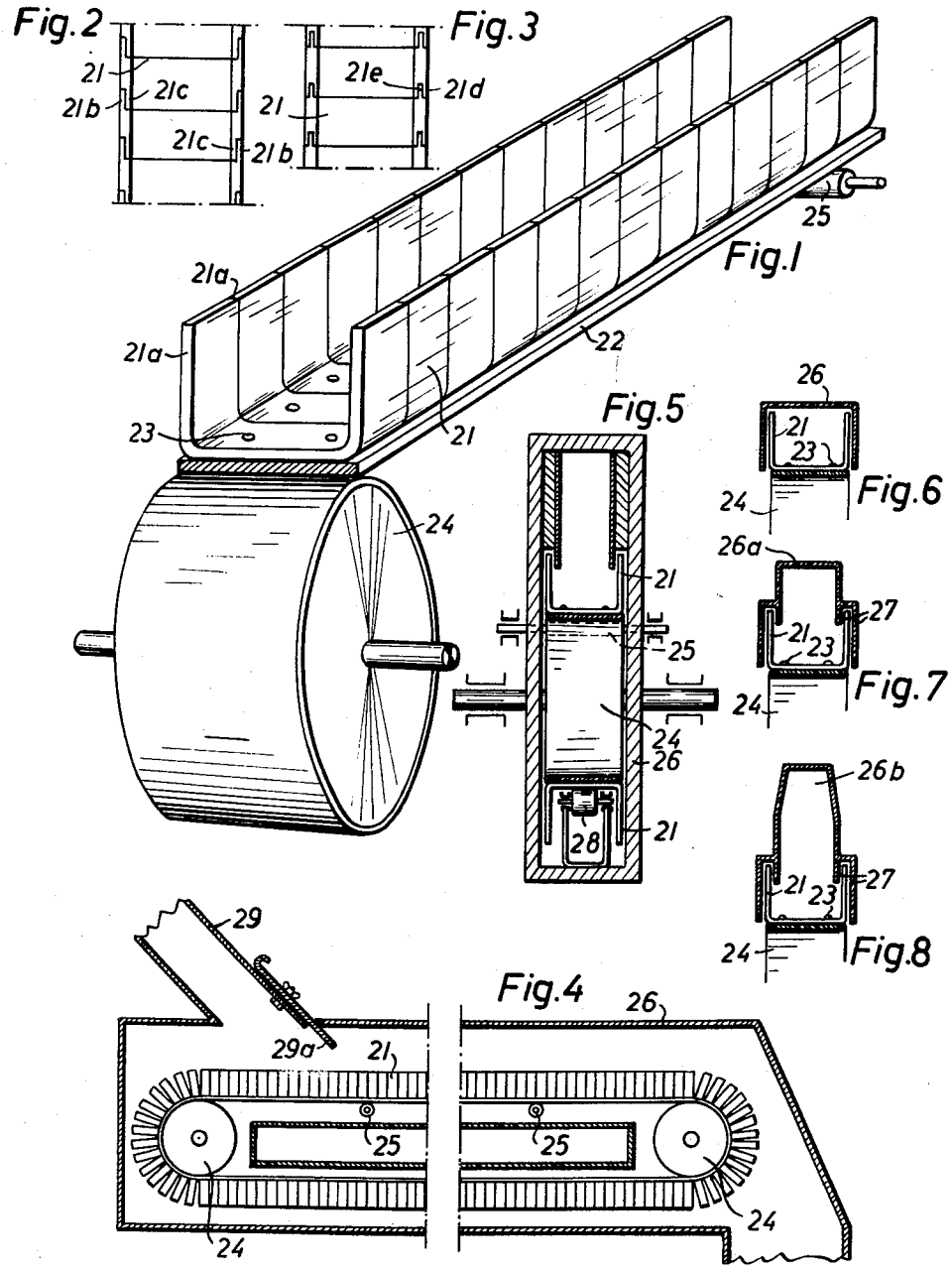
INVENTOR.
Karl Neidhardt
BY
ATTYS.

March 15, 1960 K. NEIDHARDT 2,928,523
ENDLESS CONVEYOR FOR LOOSE MATERIALS
Filed May 17, 1957 2 Sheets-Sheet 2
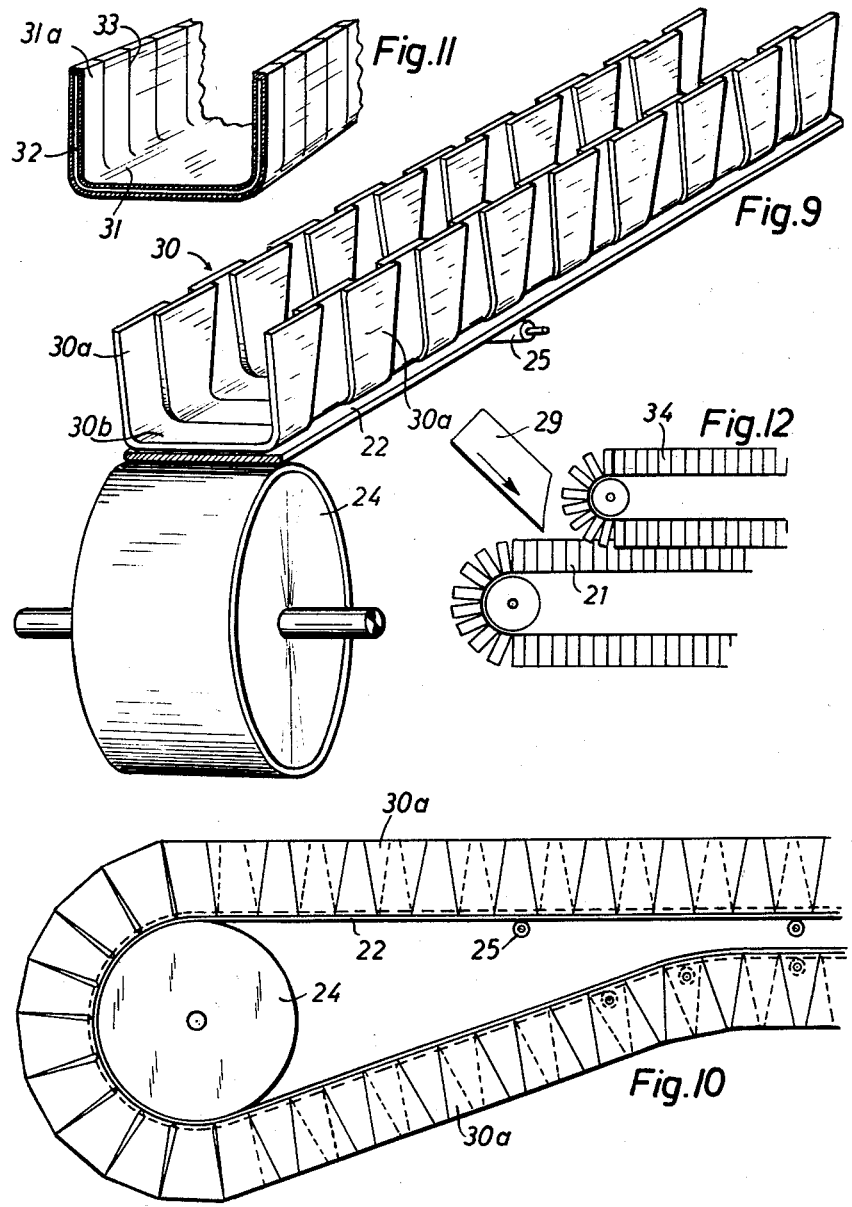
INVENTOR.
Karl Neidhardt
BY
Lowry & Rinehart
ATTYS.

United States Patent Office 2,928,523
Patented Mar. 15, 1960

2,928,523

ENDLESS CONVEYOR FOR LOOSE MATERIALS

Karl Neidhardt, Koln-Deutz, Germany, assignor to Heinr. Auer, Muhlenwerke, Koln-Deutz, Germany, a firm Application May 17, 1957, Serial No. 659,977

Claims priority, application Germany May 19, 1956

5 Claims. (Cl. 198—52)

This invention relates to endless conveyors and more particularly to a trough-like, endless conveyor especially adapted for conveying highly sensitive loose materials, such as seed, mill products, semolina, and wheat germs.

In one form of trough-like chain conveyor known in the prior art, the conveying element consists of a conveyor chain with flights attached thereto which are drawn along the bottom of a fixed trough, the flights dragging the material being conveyed along the trough. It is necessary in this form to overcome a high friction resistance, depending somewhat upon the material to be conveyed, and there is severe wear on the bottom of the trough and chain, as well crushing of the material.

In other known conveyors for loose materials the conveying means is formed as a jointed band, the links of which are open on the upper side. The trough links are so large that there are wide gaps between their bottoms upon deflection of the jointed bands. For this reason, it is necessary to insert accordion-like hinge connections and to cover the same by protective plates. Such an arrangement is injurious to highly sensitive loose materials. The grooves formed tend to accumulate residues of the material, which is pulverized and crushed upon movement of the conveyor. For these reasons it is difficult or even impossible to keep the whole conveying device clean and sanitary. Moreover, this construction, and especially the large form of the trough links, prevents movement of the conveyor at a high speed. The jointed bands may travel at a low speed only.

There are known conveying devices which convey the material in a careful manner, but show other disadvantages, such as over-large trough links, an overly thin layer of conveyed material, and the need for heavy tensioning devices. These may be enclosed only with difficulty by completely surrounding them with a casing, and then the casing is difficult to keep clean.

This invention has for its object the provision of a conveying device in which the conveying means is formed as an endless band, with a plurality of U-shaped elements attached thereto with their open ends in abutting relationship to form a continuous trough.

A further object of the invention is to provide a conveyor in which the structure is rather narrow in width but which has a deep conveyor trough, enabling it to carry a large amount of material and thereby have a large capacity in spite of its narrow width.

It is a further object of the invention to provide an improved structure which has several advantages. By providing the jointed band with closely abutting U-shaped links, and side walls extending in an upward direction, a conveying trough is obtained in which the material to be conveyed lies completely undisturbed during travel, so that damage-free conveying of the material is insured. Because of its shape with high side walls and because the end faces of the U-shaped trough links are in close abutting contact, the conveying band is largely self-carrying and rests upon its supporting rolls with a minimum of sagging. The relatively narrow width of the trough links permits the conveyor to be moved at a considerable speed with remarkable increase in capacity. The manner in which the band formed by the trough links is rolled off on the driving and guide pulleys is such that movement at high speed is possible. This is important for conveying devices for sensitive materials which extend over lengths of 80 to 100 meters or more.

Still another object of the invention is to provide a conveyor in which the deep trough links are rectangular in cross section and in which the side walls of the links cooperate with an upper stationary part of the trough, in which the jointed band is movable as a lower part. The side walls of the upper stationary part cover the side walls of the lower part and in this manner provide a box shaped, tightly closed conveying device in which the conveying trough is closed against inner and outer contaminations. The inner surfaces of the jointed band are kept clean, and this is of utmost importance in conveying foodstuffs, such as semolina. The smallest contamination by scattering of deposits on the band may result in the formation of vermin nests which may only be removed with great difficulty.

In a further modification, the upper trough may be made movable in the same manner as the lower trough, and this forms a closed, box-like conveyor which moves with minimum resistance and maximum protection.

In the drawings are illustrated by way of example several embodiments of the invention, and Fig. 1 is a perspective view of a part of the conveying band made in accordance with the invention.

Fig. 2 shows a modification of the trough structure in which the trough links are made to overlap.

Fig. 3 discloses a second modification of overlapped trough links.

Figs. 4 and 5 show in longitudinal section and in cross section, respectively, a structure in which the conveying trough cooperates with a stationary upper trough.

Figs. 6, 7 and 8 illustrate various modifications of a fixed upper trough cooperating with the movable conveyor trough of the invention.

Fig. 9 is a perspective view showing a further modification of the basic trough structure.

Fig. 10 is a fragmentary, side elevation of the modification illustrated in Fig. 9.

Fig. 11 illustrates partially in cross-section and partially in fragmentary perspective a further modification of trough structure in which the conveyor is made of elastic material provided with U-shaped metallic inserts.

Fig. 12 is a fragmentary, side elevation showing a modification in which the upper trough is movable and constructed similarly to the lower trough.

The conveying means made in accordance with the invention consists essentially of a jointed band which has U-shaped trough links 21 made of a planar strip of material bent upwardly at opposite ends. The trough links 21 are rigidly attached to a flat belt 22 by any desired means 23, such as screws, bolts or rivets. The belt 22 is preferably an endless belt which is carried at the ends over guide pulleys 24. Between the guide pulleys may be arranged smaller supporting rolls 25. The belt 22 is preferably a belt of high strength. The U-shaped trough links 21 attached to the belt 22 may consist of steel or light metal. They are preferably attached in such manner that their end faces 21a closely abut one another so that a box-shaped tightly closed conveying device is formed. If desired, the end faces as shown in Fig. 2 may be provided alternatively with tongues 21b and 21c, the thickness of which tongues is approximately one half of the thickness of the side walls of the trough links, and the tongues overlapping as shown.

Fig. 3 shows a further embodiment in which the abutting end faces are provided with a tongue 21e and a groove 21d. It will be noted that in the several modifications of trough links that when the conveyor is moving along the upper straight reach of its path, the trough links are closely arranged so that they form a box-shaped conveying trough, which is resistant to downward deflection. However, when the conveyor reaches the bent portion of the path at the supporting and driving pulleys 24, the trough links readily separate to follow the pulleys.

The conveying means of the invention is well suited for an installation in which an upper fixed trough 26 may cover the conveyor structure. In a simple form as shown in Fig. 6 the upper fixed trough is rectangular in cross-section and flanges depend on opposite sides of the trough links 21.

The upper part of the trough may be formed of a different height. As shown in Fig. 6, the upper part of the trough may be closed immediately adjacent the upper ends of the side walls of the trough links 21. Figs. 7 and 8 shown upper parts 26a and 26b of the trough which have considerably greater height than the trough links. The side walls of trough 26b may converge in an upward direction. In the forms shown in Figs. 7 and 8, the upper troughs 26a and 26b may be bifurcated as at 27 to extend on opposite sides of the side walls of the trough links.

In the embodiment shown in Figs. 4 and 5, the lower slack reach of the conveyor may likewise be enclosed in the fixed trough 26, and further supported by rolls 28 or by sliding skids made from hard wood, plastics or the like. As shown in Fig. 4, the thickness of the layer of the material in the conveyor trough may be controlled by means of a slide plate 29a which is arranged near the inlet 29 of the upper trough part 26.

In the embodiment of Figs. 9 and 10, the side walls 30a of the U-shaped trough links 30 are alternately staggered in a direction transversely of the length of the conveyor, and the upper free ends of each side wall 30a diverge outwardly, so that the side walls partially overlap one another. The bottom parts 30b of the trough links closely abut end to end and are attached to the flat belt 22. This formation of the jointed band with staggered side walls of the single trough links has the advantage that the lower slack reach of the band may be carried along an arc near the upper driving reach of the band, as shown in Fig. 10, this being permitted by the diverging overlapping side walls.

In the modification of Fig. 11, there is shown a conveying trough which consists of a unitary resilient body 31 of rubber or other suitable material, which is provided with spaced U-shaped, reinforcing inserts 32. These inserts may be of metal, such as steel or aluminum alloys, or of plastics. The side walls of the rubber trough are slit between the inserts as shown at 33 in Fig. 11, so that the trough may be unitary on the straight reaches, but that the end walls will separate on the movement of the trough around the drive and supporting pulleys 24.

Fig. 12 shows a further embodiment of the conveying device in which a jointed trough 21 cooperates with a similar inverted jointed trough 34. It will be noted that the free ends of the related troughs partially overlap one another and the troughs form between them a closed trough space.

The conveying device as disclosed is particularly well suited for highly sensitive loose materials, and also materials which during travel may cause considerable wear on their support, as, for example, ores, emery or chemicals in a solid state. On the straight reaches the material is fully supported by the closely abutting links, and the conveyor structure is not subject to wear causing leakage. At the discharging pulley to material is thrown away in an arc, so that the U-shaped link is completely freed from the material. Since the end walls of the U-shaped links separate on the turns, there is no danger that material may accumulate in the cracks between the links. When long reaches are used, each pulley 24 may be provided with a drive. If the surfaces of said pulleys are adhesively coated, the diameters thereof may be reduced.

While there is herein shown and described the preferred embodiments of the invention, it is nevertheless to be understood that minor changes may be made therein without departure from the spirit and scope of the invention as claimed.

What is claimed is:

1. In an endless conveyor, at least two spaced supporting pulleys, a flat flexible belt supported by and moving around said pulleys, a plurality of U-shaped trough links secured to said belt at their bights and having the end faces of their open ends in closely abutting relationship, and a fixed inverted trough supported over the upper reach of said conveyor, said fixed trough having bifurcated depending side walls, the furcations extending over opposite faces of the side walls of the U-shaped trough links.

2. In an endless conveyor, an elongated casing, at least two spaced supporting pulleys in said casing, a flat flexible belt supported by and moving around said pulleys, a plurality of U-shaped trough links secured to said belt at their bights and having the end faces of their open ends in closely abutting relationship, a pair of spaced plates supported in the upper part of said casing and extending downwardly for the length thereof, the lower edges of said plates straddling the upper edges of the side walls of said trough links, and spaced supporting rollers engaging and supporting the lower reach of the conveyor belt.

3. A conveyor as set forth in claim 2 wherein said casing has an opening for admitting material to said conveyor and a wiping blade adjacent said opening to control the level of the material in said trough.

4. A conveyor as set forth in claim 3 wherein said wiping blade is adjustable from the exterior of said casing.

5. In an endless conveyor, at least two spaced supporting pulleys, a flat flexible belt supported by and moving around said pulleys and a plurality of U-shaped trough links secured to said belt at their bights and having the end faces of their open ends disconnected, but in closely abutting relationship when the links are traveling in horizontal runs, a casing for the upper run of the conveyor having side walls overlying the sides of the links to form a closure for the open upper ends of the links at the upper run of the belt and closely associated with the sides of the links whereby the casing may be filled with the material being conveyed at the upper run of the conveyor and parts of the walls of the casing extending downwardly into the open upper ends of the links in close association with the sides of the links and terminating at their lower ends nearer the upper ends of the links than the bottom of the conveyor to offer a minimum of resistance to the movement of the material on the conveyor.

References Cited in the file of this patent

UNITED STATES PATENTS

| Number | Name | Date |
|---|---|---|
| 312,891 | Pearce | Feb. 24, 1885 |
| 476,787 | Dale | June 14, 1892 |
| 878,650 | Manning | Feb. 11, 1908 |
| 993,418 | Smith | May 30, 1911 |
| 1,423,649 | Daniel | July 25, 1922 |
| 1,545,759 | Guignard et al. | July 14, 1925 |
| 1,744,676 | Redler | Jan. 21, 1930 |
| 1,831,629 | Mambourg | Nov. 10, 1931 |
| 2,510,212 | Donnell | June 6, 1950 |
| 2,584,134 | Knutson | Feb. 5, 1952 |
| 2,711,816 | Reno | June 28, 1955 |